US009639912B2

(12) United States Patent
Zhou et al.

(10) Patent No.: US 9,639,912 B2
(45) Date of Patent: May 2, 2017

(54) METHOD FOR REVERSIBLE IMAGE DATA HIDING

(71) Applicant: University of Macau, Macau (CN)

(72) Inventors: Jiantao Zhou, Macau (CN); Weiwei Sun, Macau (CN); Li Dong, Macau (CN)

(73) Assignee: UNIVERSITY OF MACAU, Macau (CN)

( * ) Notice: Subject to any disclaimer, the term of this patent is extended or adjusted under 35 U.S.C. 154(b) by 141 days.

(21) Appl. No.: 14/585,749

(22) Filed: Dec. 30, 2014

(65) Prior Publication Data
US 2016/0189325 A1 Jun. 30, 2016

(51) Int. Cl.
G06F 21/62 (2013.01)
G06T 1/00 (2006.01)
G06K 9/62 (2006.01)
G06K 9/52 (2006.01)
(Continued)

(52) U.S. Cl.
CPC ............... G06T 1/005 (2013.01); G06K 9/52 (2013.01); G06K 9/6215 (2013.01); G06K 9/6267 (2013.01); G06T 1/0035 (2013.01); G09C 5/00 (2013.01); H04L 9/0637 (2013.01); G06T 2201/0053 (2013.01); G06T 2201/0061 (2013.01); G06T 2201/0083 (2013.01); G06T 2201/0203 (2013.01); H04L 2209/16 (2013.01)

(58) Field of Classification Search
CPC ... H04L 9/18; H04L 9/065; H04L 9/30; G06T 9/005; G06T 7/60; G06K 9/52; G06K 9/6267

USPC .......................................... 380/28
See application file for complete search history.

(56) References Cited

U.S. PATENT DOCUMENTS 5,960,086 A * 9/1999 Atalla ................... H04L 9/0891
380/260
6,513,118 B1 * 1/2003 Iwamura .............. G06Q 20/382
705/64
(Continued)

FOREIGN PATENT DOCUMENTS

CA 2265647 C * 9/2003 ........... G06T 1/0028
CN 103617607 A * 3/2014

OTHER PUBLICATIONS

M. U. Celik, G. Sharma, A. Tekalp, and E. Saber, "Lossless Generalized-LSB Data Embedding," IEEE Trans. Image Process., 2005, vol. 14, No. 2, pp. 253-266.
(Continued)

Primary Examiner — Amir Mehrmanesh
Assistant Examiner — Sakinah Taylor
(74) Attorney, Agent, or Firm — Bacon & Thomas, PLLC

(57) ABSTRACT

A method for reversible image data hiding includes steps of encrypting an original image by an encryption process to generate an encrypted image, embedding a message into the encrypted image by an embedment process to generate an embedded image, and extracting the message and the original image from the embedded image by a decryption and extraction process. The encryption process includes generating a key stream by using a secret encryption key, and generating an encrypted image by XORing the original image with the key stream. The embedment process includes generating an embedded image by embedding the message via XORing the encrypted image with a predetermined public key set.

9 Claims, 5 Drawing Sheets

(51) Int. Cl.
G09C 5/00 (2006.01)
H04L 9/06 (2006.01)

(56) References Cited

U.S. PATENT DOCUMENTS

| | | | | |
|---|---|---|---|---|
| 2003/0007639 A1* | 1/2003 | Lambert | ............... | H04L 9/065 380/263 |
| 2004/0215963 A1* | 10/2004 | Kaplan | ................. | G06F 21/34 713/172 |
| 2011/0311054 A1* | 12/2011 | Wang | .................. | H04L 9/0668 380/277 |
| 2013/0243187 A1* | 9/2013 | Horstmeyer | ............. | H04L 9/28 380/28 |
| 2013/0243242 A1* | 9/2013 | Gu | .................... | G06K 9/00355 382/103 |
| 2015/0104004 A1* | 4/2015 | Holman | ............. | H04N 1/4486 380/28 |

OTHER PUBLICATIONS

M. U. Celik, G. Sharma and A. M. Tekalp, "Lossless Watermarking for Image Authentication: A New Framework and an Implementation," IEEE Trans. Image Process., 2006, vol. 15, No. 4, pp. 1042-1049.
Z. Ni, Y. Shi, N. Ansari, and W. Su, "Reversible Data Hiding," IEEE Trans. Circuits Syst. Video Technol., 2006, vol. 16, No. 3, pp. 354-362.
W. L. Tai, C. M. Yeh, and C. C. Chang, "Reversible Data Hiding Based on Histogram Modification of Pixel Differences," IEEE Trans. Circuits Syst. Video Technol., 2009, vol. 19, No. 6, pp. 906-910.
J. Tian, "Reversible Data Embedding Using a Difference Expansion," IEEE Trans. Circuits Syst. Video Technol., 2003, vol. 13, No. 8, pp. 890-896.
Y. Hu, H. K. Lee, and J. Li, "DE-Based Reversible Data Hiding with Improved Overflow Location Map," IEEE Trans. Circuits Syst. Video Technol., 2009, vol. 19, No. 2, pp. 250-260.
X. Li, B. Yang, and T. Zeng, "Efficient Reversible Watermarking Based on Adaptive Prediction-Error Expansion and Pixel Selection," IEEE Trans. Image Process., 2011, vol. 20, No. 12, pp. 3524-3533.
X. Zhang, "Reversible Data Hiding with Optimal Value Transfer," IEEE Trans. Multimedia, 2013, vol. 15, No. 2, pp. 316-325.
T. Bianchi, A. Piva, and M. Barni, "On the Implementation of the Discrete Fourier Transform in the Encrypted Domain," IEEE Trans. Inf. Forensics and Security, 2009, vol. 4, No. 1, pp. 86-97.
T. Bianchi, A. Piva, and M. Barni,"Composite Signal Representation for Fast and Storage-Efficient Processing of Encrypted Signals," IEEE Trans. Inf. Forensics and Security, 2010, vol. 5, No. 1, pp. 180-187.
M. Barni, F. P., R. Lazzeretti, A.-R. Sadeghi, and T. Schneider, "Privacy-Preserving ECG Classification with Branching Programs and Neural Networks," IEEE Trans. Inf. Forensics and Security, 2011, vol. 6, No. 2, pp. 452-468.
Z. Erkin, T. Veugen, T. Toft, and R. Lagendijk, "Generating Private Recommendations Efficiently Using Homomorphic Encryption and Data Packing," IEEE Trans. Inf. Forensics and Security, 2012, vol. 7, No. 3, pp. 1053-1066.
M. Chandramouli, R. Iorga and S. Chokhani, "Cryptographic Key Management Issues and Challenges in Cloud Services," NIST Report 7956, 2013, pp. 1-31.
X. Zhang, "Separable Reversible Data Hiding in Encrypted Image," IEEE Trans. Inf. Forensics and Security, 2012, vol. 7, No. 2, pp. 826-832.
X. Zhang, "Reversible Data Hiding in Encrypted Image," IEEE Signal Processing Letters, 2011, vol. 18, No. 4, pp. 255-258.
T. Hong, W. Chen and H. Wu, "An Improved Reversible Data Hiding in Encrypted Images Using Side Match," IEEE Signal Processing Letters, 2012, vol. 19, No. 4, pp. 199-202.
W. Puech, M. Chaumont and O. Strauss, "A Reversible Data Hiding Method for Encrypted Images," in Proc. of SPIE 6819, 2008, pp. 1-9.
X. Zhang, Z. Qian, G. Feng, and Y. Ren, "Efficient reversible data hiding in encrypted images," J. Vis. Commun. Image R., 2014, vol. 25, No. 2, pp. 322-328.
K. Ma, W. Zhang, X. Zhao, N. Yu, and F. Li, "Reversible Data Hiding in Encrypted Images by Reserving Room Before Encryption," IEEE Trans. Inf. Forensics and Security, 2013, vol. 8, No. 3, pp. 553-562.
Z. Qian, X. Zhang, and S. Wang, "Reversible Data Hiding in Encrypted JPEG Bitstream," IEEE Trans. Multimedia, 2013, vol. 15, No. 2, pp. 316-325.
X. Zhang and J. Wang, "Spread spectrum image data hiding in the encrypted discrete cosine transform coefficients," J. Electron. Imaging, 2013, vol. 22, No. 4, p. 043029.
W. Zhang, K. Ma, and N. Yu, "Reversibility mproved data hiding in encrypted images," Sig. Proc., 2014, vol. 94, No. 1, pp. 118-127.
B. Yang, C. Busch, and X. Niu, "Joint Reversible Data Hiding and Image Encryption," in Proc. of SPIE 7541, 2010, pp. 1-10.
H. Lipmaa, P. Rogaway, and D. Wagner, "Ctr-mode encryption," [Online] Available: http://csrc.nist.gov/encryption/modes/workshop1/papers/lipmaa-ctr.pdf.
J. MacDonald, "Design Methods for Maximum Minimum-Distance Error-Correcting Codes," IBM J., 1960, pp. 43-57.
R. Hamming, "Error Detecting and Error Correcting Codes," Bell Sys. Tech. J., 1950, vol. 29, pp. 147-160.
C.-C. Chang and C.-J. Lin, "LIBSVM: A Library for Support Vector Machines," ACM Trans. Intelligent Syst. and Technol., 2011, vol. 2, No. 3, pp. 27-53.
A. Buades, B. Coll, and J. Morel, "A non-local algorithm for image denoising," in Proc. of CVPR, 2005, pp. 60-65.
F. Cayre, C. Fontaine, and T. Furon, "Watermarking Security: Theory and Practice," IEEE Trans. Sig. Proc., 2005, vol. 53, No. 10, pp. 3976-3987.
L. Trevisan, Cryptography: Lecture Notes from CS276. Stanford University, Online available: http://theory.stanford.edu/~trevisan/books/crypto.pdf, Sep. 2011.

* cited by examiner

METHOD FOR REVERSIBLE IMAGE DATA HIDING

TECHNICAL FIELD

The invention is in the field of Reversible Image Data Hiding (RIDH).

BACKGROUND

Reversible image data hiding (RIDH) is a special category of data hiding technique, which ensures perfect reconstruction of the cover image upon the extraction of the embedded message. The reversibility makes such image data hiding approach particularly attractive in the critical scenarios, e.g., military and remote sensing, medical images sharing, law forensics and copyright authentication, where high fidelity of the reconstructed cover image is required.

The majority of the existing RIDH algorithms are designed over the plaintext domain, namely, the message bits are embedded into the original, un-encrypted images. The early works mainly utilized the lossless compression algorithm to compress certain image features, in order to vacate room for message embedding. However, the embedding capacity of this type of method is rather limited and the incurred distortion on the watermarked image is severe. Histogram shifting (HS)-based technique is another class of approach achieving better embedding performance though shifting the histogram of some image features. The latest prediction error expansion (PEE)-based schemes were shown to be able to offer the state-of-the-art capacity-distortion performance.

Recently, the research on signal processing over encrypted domain has gained increasing attention, primarily driven by the needs from Cloud computing platforms and various privacy-preserving applications. This has triggered the investigation of embedding additional data in the encrypted images in a reversible fashion. In many practical scenarios, e.g., secure remote sensing and Cloud computing, the parties who process the image data are un-trusted. To protect the privacy and security, all images will be encrypted before being forwarded to an un-trusted third party for further processing. This implies that the message embedding operations have to be conducted entirely over the encrypted domain. In addition, similar to the case of Cloud computing, it is practically very costly to implement a reliable key management system (KMS) in such multi-party environment over insecure public networks, due to the differences in ownership and control of underlying infrastructures on which the KMS and the protected resources are located.

Some recent attempts were made on embedding message bits into the encrypted images. For example, a simple substitution method to insert additional bits into AES encrypted images. Local standard deviation (SD) was then exploited at the decoder side to extract the embedded bits and reconstruct the original image. For instance, a method to embed additional message bits into stream cipher encrypted images by flipping 3 LSBs of half of the pixels in a block. The data extraction can be performed by utilizing the local smoothness inherent to natural images. This method was improved through a side match technique. As local smoothness does not always hold for natural images, data extraction errors can be observed in the textured regions. Further, a separable RIDH method such that the protection scopes of data hiding key and encryption key are gracefully separated was proposed. The lossless compression based RIDH approach was extended to the encrypted domain, namely, losslessly compress half of the 4th LSBs of the encrypted image via LDPC coding to create space for data hiding. As the source coding with side information at the decoder requires a feedback channel, this scheme would face severe challenges in many practical scenarios, e.g., secure remote sensing, where the feedback channel could be very costly. More recently, a new embedding method by reserving room before encryption with a traditional reversible image watermarking algorithm as suggested. Essentially, partial embedding operations were shifted to the encode side, resulting in non-negligible increase of the encryption complexity and non-standard way of performing encryption. Other approaches were also reported.

It should be noted that the embedding security of all the existing encrypted-domain RIDH schemes depends on an extra data hiding key shared between the data hider and the recipient. As mentioned earlier, the key management functions, e.g., the key generation, activation, de-activation, suspension, expiration, destruction, archival, and revocation, are difficult to be reliably implemented within such distributed infrastructure.

SUMMARY

In one embodiment, a method for reversible image data hiding is described. The method for reversible image data hiding comprising: encrypting an original image by an encryption process to generate an encrypted image, embedding a message into the encrypted image by an embedment process to generate an embedded image, and extracting the message and the original image from the embedded image by a decryption and extraction process. The encryption process including: generating a key stream by using a secret encryption key, and generating an encrypted image by XORing the original image with the key stream. The embedment process including: generating an embedded image by embedding the message via XORing the encrypted image with a predetermined public key set.

In one embodiment, generating an embedded image by embedding the message via XORing the encrypted image with a predetermined public key further comprises: dividing the encrypted image into encrypted blocks, extracting the message into bits of the message, finding a public key of the public key set associated with each of the bits of the message, and XORing each of the public keys with each of the encrypted blocks to generate embedded blocks.

In one embodiment, generating an embedded image by embedding the message via XORing the encrypted image with a predetermined public key further comprises: performing XORing each of the public keys with each of the encrypted blocks to generate the embedded blocks until all of the bits of the message are embedded, and assembling the embedded blocks to generate the embedded image.

In one embodiment, the encrypted blocks are non-overlapping, the public keys are binary public keys, and each of the public keys has a maximized minimum-Hamming distance.

In one embodiment, no private key for data hiding other than the secret encryption key is used.

In one embodiment, a method for reversible image data hiding is described. The method for reversible image data hiding comprising: encrypting an original image by an encryption process to generate an encrypted image, embedding a message into the encrypted image by an embedment process to generate an embedded image, and extracting the message and the original image from the embedded image by a decryption and extraction process. The encryption process including: generating a key stream by using a secret encryption key, and generating an encrypted image by XORing the original image with the key stream. The embedment process including: generating an embedded image by embedding the message via XORing the encrypted image with a predetermined public key set. The decryption and extraction process including: generating a decrypted image by XORing the embedded image with the key stream, and generating the message and the original image by XORing the decrypted image with the public key set.

In one embodiment, generating an embedded image by embedding the message via XORing the encrypted image with a predetermined public key further comprises: dividing the encrypted image into encrypted blocks, extracting the message into bits of the message, finding a public key of the public key set associated with each of the bits of the message, and XORing each of the public keys with each of the encrypted blocks to generate embedded blocks.

In one embodiment, generating an embedded image by embedding the message via XORing the encrypted image with a predetermined public key further comprises: performing XORing each of the public keys with each of the encrypted blocks to generate the embedded blocks until all of the bits of the message are embedded, and assembling the embedded blocks to generate the embedded image.

In one embodiment, generating the message and the original image by XORing the decrypted image with the public key set further comprises: dividing the decrypted image into decrypted blocks, creating decoding candidates by XORing the decrypted blocks with each public key of the public key set, and identifying which of the decoding candidates are original blocks of the original image by determining the bits of the message through a classifier.

In one embodiment, generating the message and the original image by XORing the decrypted image with the public key set further comprises: detecting and correcting errors according to the property of non-local image similarity, assembling the bits of the message to generate the message, and assembling the original blocks of the original image to generate the original image.

In one embodiment, detecting and correcting errors according to the property of non-local image similarity further comprises: computing a minimum patch distance within a search window.

In one embodiment, the classifier is a two-class support vector machine classifier.

In one embodiment, the public keys are binary public keys, each of the public keys has a maximized minimum-Hamming distance, and the decrypted blocks are non-overlapping.

In one embodiment, no private key for data hiding other than the secret encryption key is used.

In one embodiment, a method for reversible image data hiding is described. The method for reversible image data hiding comprising: pre-negotiating a secret encryption key between a first electronic device and a third electronic device, encrypting an original image by an encryption process to generate an encrypted image by the first electronic device, sending the encrypted image to a second electronic device from the first electronic device, embedding a message into the encrypted image by an embedment process to generate an embedded image by the second electronic device which does not know the secret encryption key, sending the embedded image to the third electronic device from the second electronic device, and extracting the message and the original image from the embedded image by a decryption and extraction process by the third electronic device. The encryption process including: generating a key stream by using the secret encryption key, and generating an encrypted image by XORing the original image with the key stream. The embedment process including: generating an embedded image by embedding the message via XORing the encrypted image with a predetermined public key set. The decryption and extraction process including: generating a decrypted image by XORing the embedded image with the key stream, and generating the message and the original image by XORing the decrypted image with the public key set.

In one embodiment, generating an embedded image by embedding the message via XORing the encrypted image with a predetermined public key further comprises: dividing the encrypted image into encrypted blocks, extracting the message into bits of the message, finding a public key of the public key set associated with each of the bits of the message, XORing each of the public keys with each of the encrypted blocks to generate embedded blocks, and assembling the embedded blocks to generate the embedded image.

In one embodiment, generating the message and the original image by XORing the decrypted image with the public key set further comprises: dividing the decrypted image into decrypted blocks, creating decoding candidates by XORing the decrypted blocks with each public key of the public key set, and identifying which of the decoding candidates are original blocks of the original image by determining the bits of the message through a classifier.

In one embodiment, generating the message and the original image by XORing the decrypted image with the public key set further comprises: detecting and correcting errors according to the property of non-local image similarity, assembling the bits of the message to generate the message, and assembling the original blocks of the original image to generate the original image.

In one embodiment, the first electronic device is a satellite, the second electronic device is a base station, and the third electronic device is a data center.

In one embodiment, no private key for data hiding other than the secret encryption key is used.

DETAILED DESCRIPTIONS

Methods for Reversible Image data Hiding (RIDH) are described. In the following, various specific details are set forth in order to provide a thorough understanding of embodiments of the present invention. It will be apparent, however, to one skilled in the art that embodiments of the present invention may be practiced without these specific details. In other instances, well-known technical features are not described in detail in order to not unnecessarily obscure embodiments of the present invention.

In this work, we propose a method for encrypted-domain RIDH by specifically taking the above-mentioned design preferences into consideration. The proposed technique embeds message through a public key modulation mechanism, and performs data extraction by exploiting the statistical distinguishability of encrypted and non-encrypted image blocks. A very desirable property of our framework is that the secret encryption key K is naturally extended to offer protection for message embedding, which eliminates the necessity of a data hiding key. As a result, the cost and the potential risk of building up a KMS in the multi-party environment can be significantly reduced. In contrast, all the existing RIDH solutions have to rely on an extra data hiding key shared between the data hider and the recipient, so as to guarantee the embedding security. Furthermore, compared with the state-of-the-arts, the proposed approach provides higher embedding capacity, and is able to achieve perfect reconstruction of the original image as well as the embedded message bits. Extensive experimental results on 100 test images validate the superior performance of our method.

Methods for reversible image data hiding (RIDH) over encrypted domain, which does not require a secret data hiding key, while still ensuring that only the party with the secret encryption key K can disclose the embedded message, is described in the present invention. This could be very valuable in practice, as the cost and the potential risk of building up the KMS can be significantly reduced. Intuitively, this is achievable because the security offered by the encryption key may be appropriately extended to protect the data embedding. In the following sections, we propose an encrypted-domain secure RIDH scheme without data hiding key. Here, some design goals are slightly different from those of the existing solutions, due to the elimination of the data hiding key. In the prior art, the images after direct decryption (i.e., decryption without data extraction) are required to be of high quality. However, such requirement becomes invalid in our framework since we only have one single encryption key, making the decryption and data extraction naturally tie together.

Figure 1:
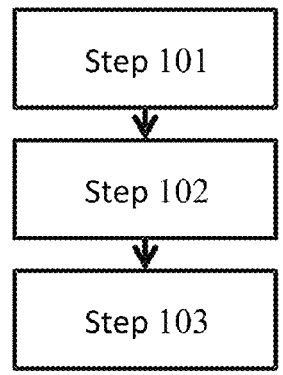
FIG. 1 is a flow chart illustrating a method for reversible image data hiding according to an embodiment of the present application.

As illustrated in FIG. 1, the method for reversible image data hiding comprising:

Step 101: encrypting an original image by an encryption process to generate an encrypted image, Step 102: embedding a message into the encrypted image by an embedment process to generate an embedded image, and Step 103: extracting the message and the original image from the embedded image by a decryption and extraction process.

The encrypted process is described in detail in the following. Instead of considering dedicated encryption algorithms tailored to the scenario of encrypted-domain data hiding, we here stick to the conventional stream cipher applied in the standard format. That is, the ciphertext can be generated by bitwise XORing the plaintext with the key stream. The resulting data hiding paradigm over encrypted domain could be more practically useful because of two reasons: 1) stream cipher used in the standard format (e.g., AES in the CTR mode, in abbreviation, AES-CTR), is still one of the most popular and reliable encryption tools, due to its provable security and high software/hardware implementation efficiency. It may not be easy, or even infeasible, to persuade customers to adopt new encryption algorithms that have not been thoroughly evaluated; 2) large number of data have already been encrypted using stream cipher in a standard way. In this case, dedicated encryption algorithms cannot be assumed.

When stream cipher is employed, the encrypted image can be generated by $[[f]]=Enc(f,K)=f \oplus K$ where f denotes the original image and $[[f]]$ denotes the encrypted image, respectively. Here, K denotes the key stream generated by using the secret encryption key K. That is, the encrypted image can be generated by XORing the original image with the key stream. For example, all the images can be assumed to be 8-bit. In the present invention, we use $[[x]]$ to represent the encrypted version of x. Clearly, the original image can be obtained by XORing the original image with the key stream performing the following decryption function $f=Dec([[f]], K)=[[f]] \oplus K$.

The embedding process is described in detail in the following.

Figure 2:
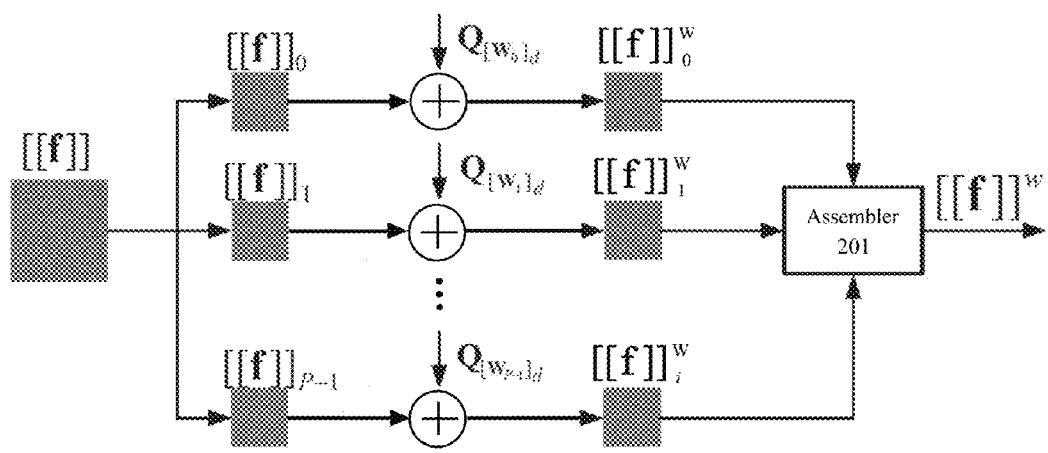
FIG. 2 illustrates an embedment process according to an embodiment of the present application.

Referring to FIG. 2, in the embedment process, the embedded image can be generated by embedding the message via XORing the encrypted image with a predetermined public key set.

As mentioned earlier, the encrypted image $[[f]]$ now serves as the cover to accommodate message to be hidden. First, the encrypted image $[[f]]$ can be divided into a series of non-overlapping encrypted blocks $[[f]]_i$'s of size M×N, where i is the block index. Each encrypted block is designed to carry n bits of message. To enable efficient embedding, a public key set having $S=2^n$ binary public keys $Q_0, Q_1, \ldots, Q_{S-1}$, each of which is, for example, of length L=M×N×8 bits, can be used. Note that all public keys $Q_j$'s, for $0 \leq j \leq S-1$, are made publicly accessible, which implies that even the attacker knows them. These public keys are predetermined prior to the message embedding, according to a criterion of maximizing the minimum Hamming distance among all the public keys. Also, for fixed S and L, an upper bound on the minimum Hamming distance can be given as follows. Define an integer m by:

$$\sum_{i=0}^{m} Ui \leq \frac{2^U}{S} < \sum_{i=0}^{m+1} Ui$$

where $$Ui = \frac{U!}{i!(U-i)!}.$$

Then the minimum Hamming distance among all $Q_j$'s satisfies $$d_{min} \leq \begin{cases} 2m+1 & \text{for } L=U \\ 2m+2 & \text{for } L=U+1 \end{cases}.$$

Figure 3:
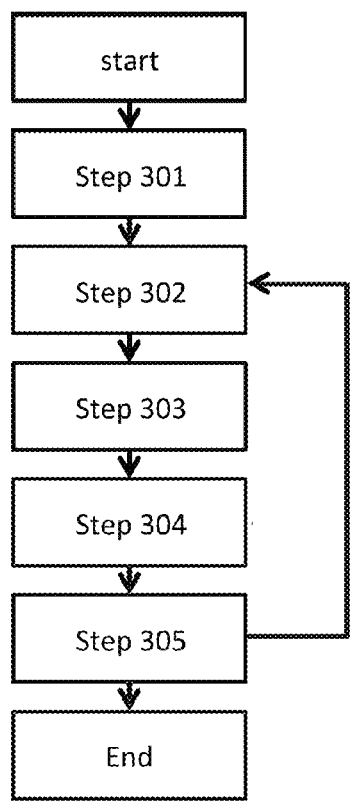
FIG. 3 is a flow chart illustrating an embedment process according to an embodiment of the present application.

More specifically, referring to FIG. 3, the steps of performing the embedment process are described as follows:

Step 301: Initialize block index i=1.

Step 302: Extract n bits of the message to be embedded, denoted by $W_i$.

Step 303: Find the public key $Q_{[W_i]_d}$ associated with the bits $W_i$, where the index $[W_i]_d$ is the decimal representation of the bits $W_i$. For instance, when n=3 and $W_i$=010, the corresponding public key is $Q_2$.

Step 304: Embed the length-n message bits $W_i$ into the ith encrypted block via $[[f]]_i^w=[[f]]_i \oplus Q_{[W_i]_d}$. Thus, the embedded blocks can be generated.

Step 305: Increment i=i+1, and repeat Steps 302 to 305 until all the message bits are inserted.

After that, as depicted in FIG. 2, the embedded blocks can be assembled by the assembler 201 to generate an embedded image.

From the above steps, it can be seen that the message embedding is performed without the aid of a secret data hiding key. As will be described, high level of embedding security can still be guaranteed, thanks to the protection offered by the secret encryption key K. In other words, the protection mechanism in the encrypted domain is naturally extended to provide security for message embedding, eliminating the necessity of introducing an extra data hiding key. This could lead to significant reduction of the computational cost and potential risk of building up a secure KMS, which has been proved to be very challenging in the multi-party environment. In addition, the computations involved in message embedding are rather small (simple XOR operations), and all the block-by-block processing can be readily made parallel, achieving high-throughput.

To differentiate encrypted and original, un-encrypted image blocks, a feature vector $\square=(H,\sigma,V)'$, integrating the characteristics from multiple perspectives can be provided. Here, H is a tailored entropy indicator, c is the SD of the block, and V represents the directional local complexities in four directions. The formation of the above feature elements will be detailed as follows.

Compared with the original, un-encrypted block, the pixels in the encrypted block tend to have a much more uniform distribution. This motivates us to introduce the local entropy into the feature vector to capture such distinctive characteristics. However, we need to be cautious when calculating the entropy values because the number of available samples in a block would be quite limited, resulting in estimation bias, especially when the block size is small. For instance, in the case that M=N=8, there are only 64 pixel samples, while the range of each sample is from 0 to 255. To reduce the negative effect of insufficient number of samples relative to the large range of each sample, to compute the entropy quantity based on quantized samples can be provided, where the quantization step size is designed in accordance with the block size. Specifically, uniform scalar quantization can be applied to each pixel of the block $$\square f = \left\lfloor \frac{MN \cdot f}{256} \right\rfloor$$

where f and $\square f$ denote the original and the quantized pixel values, respectively. Certainly, $\square f$ falls into the range [0,MN−1]. The entropy indicator H based on quantized samples is then given by $$H = -\sum_{j=0}^{MN-1} p(j)\log p(j)$$

where p(j) is the empirical probability of j in the quantized block.

As a single, first-order entropy quantity may not be sufficient to cover all the underlying characteristics of a block, the feature vector can be augmented by introducing another element, i.e., the SD defined by $$\sigma = \sqrt{\frac{1}{MN}\sum_j (f(j)-\mu)^2}$$

where f(j) is the jth pixel in the block and $$\mu = \frac{1}{MN}\sum_j f(j)$$

is the sample mean over all the samples in the block. By including this feature element, the classification performance as the data dispersiveness can be improved and denseness can be better reflected.

Figure 4:
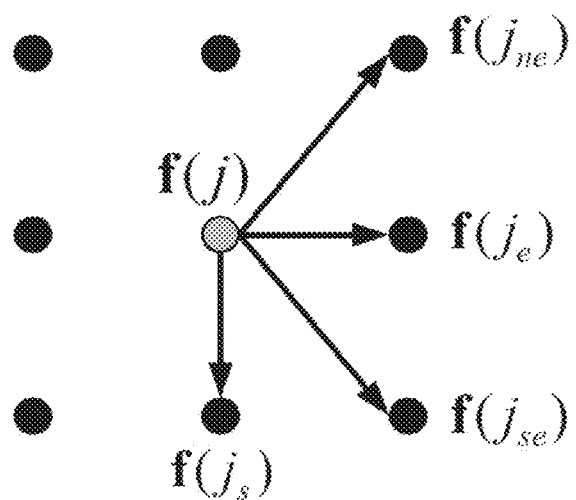
FIG. 4 is a graph illustrating the neighbors in the 45° (northeast), 0° (east), −45° (southeast) and −90° (south) directions, relative to the current pixel.

In addition to the above feature components, directional complexity indicators which encode the local geometric information are also included. To this end, a 4-tuple vector $V=(v_1,v_2,v_3,v_4)'$ can be defined, where $$v_1 = \sum_j |f(j) - f(j_{ne})|,$$

$$v_2 = \sum_j |f(j) - f(j_e)|,$$

$$v_3 = \sum_j |f(j) - f(j_{se})|,$$

$$v_4 = \sum_j |f(j) - f(j_s)|,$$

where $f(j_{ne})$, $f(j_e)$, $f(j_{se})$, and $f(j_s)$ represent the neighbors in the 45° (northeast), 0° (east), −45° (southeast) and −90° (south) directions, relative to f(j), as illustrated in FIG. 4.

Upon the determination of the feature vector $\square$, we train a two-class SVM classifier with RBF (Gaussian) kernel taking the form $$Ker(x_i,x_j)=e^{-\gamma|x_i-x_j|}.$$

The 0-class and 1-class correspond to the un-encrypted and encrypted image blocks, respectively.

Here, the training image set consists of 100 images of size 512×512, with a wide variety of characteristics including natural scenes, artificial images, synthetic images and textual images. The off-line trained SVM classifier will be used to discriminate the encrypted and non-encrypted image patches in the process of data extraction and image decryption.

The decryption and extraction process is described in detail in the following. The decoder in an electronic device, such as the data center, has the key for decryption, and attempts to recover both the embedded message and the original image simultaneously from the received $[[f]]^w$. Due to the interchangeable property of XOR operations, the decoder first XORs $[[f]]^w$ with the encryption key stream K and obtains $f^w=[[f]]^w \oplus K$.

The resulting $f^w$ is then divided into a series of non-overlapping decrypted blocks $f_i^w$'s of size M×N, similar to the operation conducted at the embedding stage. From $[[f]]_i^w = [[f]]_i \oplus Q_{[W_i]_d}$, we have $f_i^w = f_i \oplus Q_{[W_i]_d}$.

The joint data extraction and image decryption now becomes a blind signal separation problem as both the bits $W_i$ of the message and the original block $f_i$ are unknowns. Our strategy of solving this problem is based on the following observation: $f_i$, as the original block of the original image, very likely exhibits certain image structure, conveying semantic information. Note that the public keys $Q_{[W_i]_d}$ must match one of the elements in the public key set $Q=\{Q_0, Q_1, \ldots, Q_{S-1}\}$. Then if we XOR the decrypted block $f_i^w$ with all the public keys $Q_j$'s, one of the results must be the original block $f_i$, which would demonstrate structural information. As will become clear shortly, the other results correspond to randomized (encrypted-like) blocks, which can be distinguished from the original, structured original block $f_i$.

More specifically, first S decoding candidates can be created by XORing the decrypted block $f_i^w$ with all the S possible public keys $Q_0, Q_1, \ldots, Q_{S-1}$:

$$f_i^{(0)} = f_i^w \oplus Q_0 = f_i \oplus Q_{[W_i]_d} \oplus Q_0$$
$$f_i^{(1)} = f_i^w \oplus Q_1 = f_i \oplus Q_{[W_i]_d} \oplus Q_1$$
$$\vdots$$
$$f_i^{(S-1)} = f_i^w \oplus Q_{S-1} = f_i \oplus Q_{[W_i]_d} \oplus Q_{S-1}$$

As mentioned earlier, one of the above S candidates must be the original block $f_i$, while the others can be written in the form:

$$f_i^{(t)} = f_i \oplus Q_{[W_i]_d} \oplus Q_t \text{ where } t \neq [W_i]_d.$$

The result $f_i^{(t)} = f_i \oplus Q_{[W_i]_d} \oplus Q_t$ corresponds to an encrypted version of $f_i$ with equivalent key stream being $Q_{[W_i]_d} \oplus Q_t$. Notice that all the public keys $Q_j$'s, for $0 \leq j \leq S-1$, are designed to have maximized minimum-Hamming distance, and the upper bound is given in $$\sum_{i=0}^{m} U_i \leq \frac{2^U}{S} < \sum_{i=0}^{m+1} U_i \text{ and}$$

$$d_{min} \leq \begin{cases} 2m+1 & \text{for } L=U \\ 2m+2 & \text{for } L=U+1 \end{cases}.$$

Hence, $f_i^{(t)}$ tends to lose the image structural information, making it encrypted-like.

To identify which candidate corresponds to the original block $f_i$, the designed two-class SVM classifier can be applied to these S candidates. Let $r=(r_0, r_1, \ldots, r_{S-1})^t$ be the vector recording the classification results, where $r_j=0$ and $r_j=1$ correspond to the original (un-encrypted) and encrypted blocks, respectively. If there exists a unique j such that $r_j=0$, then the embedded bits of the message can be decoded as $W_i[j]_2$ where $[j]_2$ denotes the length-n binary representation of j and $n=\log_2 S$. For example, if $n=3$ and $j=7$, then $[j]_2=111$.

Upon determining the bits $W_i$ of the message, the original block can be easily recovered by: $f_i = f_i^w \oplus Q_{[W_i]_d}$.

However, we do observe several cases where there exist multiple j's or no j such that $r_j=0$. When any of these two cases happens, it indicates that some decoding errors appear. To formally analyze these errors and later suggest an effective error correction mechanism, two types of classification error can be defined:

Type I Error: $f_i^{(j)} = f_i$, while $r_j = 1$,

Type II Error: $f_i^{(j)} \neq f_i$, while $r_j = 0$.

Type I error mainly occurs when the original block $f_i$ is very complicated, e.g., from highly textured regions, behaving similarly as an encrypted block. Type II error usually arises when the block size is rather small, making an encrypted block mistakenly be classified as an original, un-encrypted one. As verified experimentally from 200 test images of size 512×512, for a specific block, we assume that at most one type of error will occur. Under this assumption, both Type I and Type II errors can be easily detected. When Type I error occurs, the classification result vector becomes r=1'. While when Type II error appears, the following inequality holds:

$$\sum_j r_j < 2^n - 1 \text{ where } n = \log_2 S.$$

Figure 5:
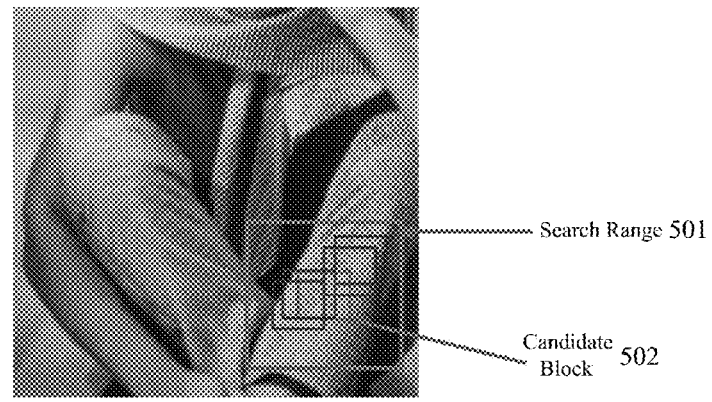
FIG. 5 is a graph illustrating an error correction mechanism according to an embodiment of the present application.

When classification errors are detected for some blocks, a mechanism to correct them is needed. Though the classifier is carefully designed, it is still difficult to distinguish those highly textured original blocks from the encrypted ones, especially when the block size is small. To solve this challenging problem, we propose to exploit the self-similarity property inherent to natural images. Even for those highly textured images, it is observed that similar blocks could be found in a non-local window, as also illustrated in FIG. 5.

According to this phenomenon, the proposed error correction approach is based on the following key observation: if a block is correctly decoded, then with very high probability, there are some similar patches around it. Such property of non-local image similarity motivates us to rank all the potential candidate blocks 502 according to the minimum distance with the patches in a non-local search window. To this end, first, a to-be-corrected (TBC) set C can be defined by:

$$C = \begin{cases} \{f_i^{(j)} | 0 \leq j \leq S-1\} & \text{Type } I \text{ error detected} \\ \{f_i^{(j)} | r_j = 0\} & \text{Type } II \text{ error detected} \end{cases}$$

For any candidate block $f_i^{(j)}$ in C, its $l_2$ distances from all the other blocks in a search range 501 $D \setminus \{f_i^{(j)}\}$ can be calculated, where D is of size 5M×5N sharing the same center as $f_i^{(j)}$. Then the minimum patch distance can be computed within the search window:

$d_i^{(j)} = \min_{D \in D \setminus \{f_i^{(j)}\}} |f_i^{(j)} - D|_F^2$ where D is an arbitrary block of size M×N within $D \setminus \{f_i^{(j)}\}$.

The candidate $f_i^{(j)}$ that gives the smallest $d_i^{(j)}$ can then be selected as the decoded block. Upon determining the index j of the employed public key, the embedded bits of the message and the original blocks of the original image can be straightforwardly recovered as in $w_i = [j]_2$ and $f_i = f_i^w \oplus Q_{[W_i]_d}$. The message and the original image can be generated by assembling the bits of the message and the original blocks of the original image. This non-local-based error correction strategy will be shown experimentally to be quite effective in detail later.

Figure 6:
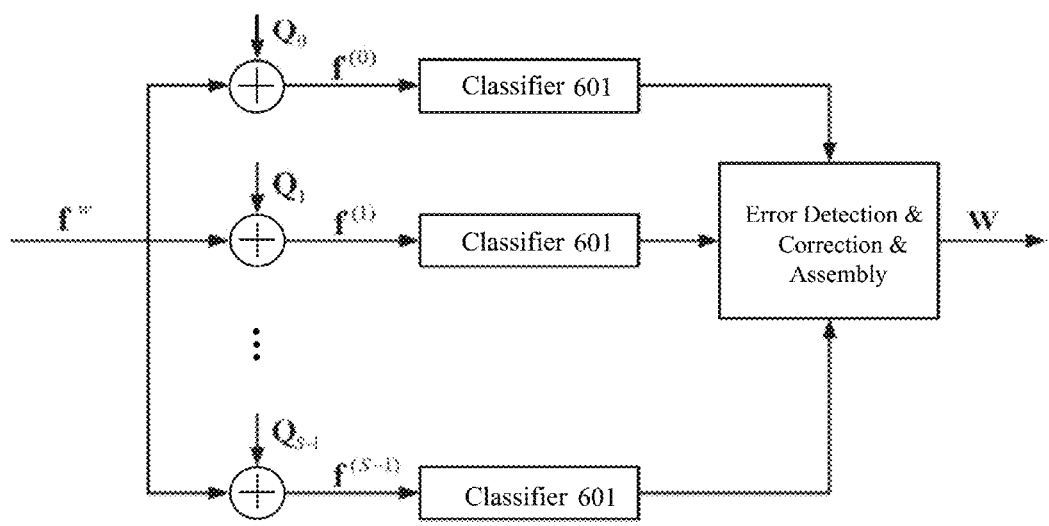
FIG. 6 illustrates a decryption and extraction process according to an embodiment of the present application.

The above decryption and extraction process can also be summarized in FIG. 6. Decoding candidates are created by XORing the decrypted blocks with each public key of the public key set, and which of the decoding candidates are original blocks of the original image was identified by classifiers 601. After errors are detected and corrected, the bits of the message and the original blocks of the original image are assembled to generate the message and the original image.

Figure 7:
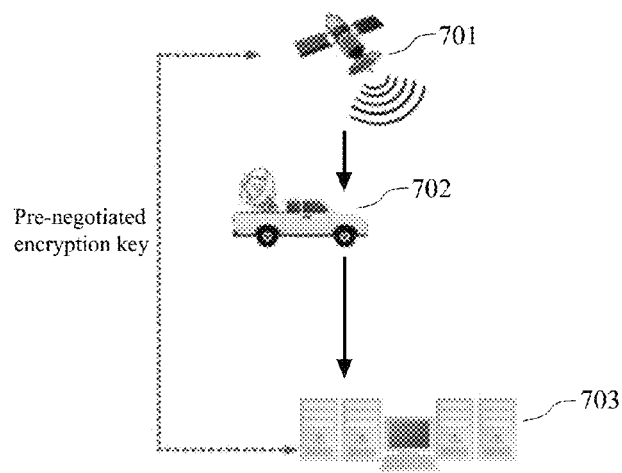
FIG. 7 illustrates an embodiment of the present application.

An embodiment of the present invention is described with FIG. 7 in the following. The original images from a first electronic device 701, such as a satellite, are encrypted and then sent to a second electronic device 702, such as a base station, as illustrated in FIG. 7. After receiving the encrypted images, the second electronic device 702 embeds a confidential message, e.g., the base station ID, location information, time of arrival (TOA), local temperature, wind speed, etc., into the encrypted images. Eventually, the encrypted image carrying the additional message is transmitted over a public network and a third electronic device 703, such as a data center for further investigation and storage. For security reasons, the second electronic device 702 has no privilege of accessing the secret encryption key K pre-negotiated between the first electronic device 701 and the third electronic device 703. This implies that the message embedding operations have to be conducted entirely over the encrypted domain. Similar to the case of Cloud computing, it is practically very costly to implement a reliable key management system (KMS) in such mufti-party environment over insecure public networks, due to the differences in ownership and control of underlying infrastructures on which the KMS and the protected resources are located. It is therefore much desired if secure data hiding could be achieved without an additional secret data hiding key between the base station and the data center. Also, simple embedding algorithm as the second electronic device 702, such as the base station, usually is constrained by limited computing capabilities and/or power. Finally, the third electronic device 703 decrypts and extracts the embedded message and recovers the original image by using the encryption key K.

In the following, the security analysis of the method for reversible image data hiding of the present application is described. According to the context of the attack, the attacker may have access to different amount of information. Clearly, the attacker at least can access to watermarked signal, namely, $[[f]]^w$. In some occasions, the embedded message or the cover signal can also be available to the attacker. Therefore, the security level of the encrypted-domain RIDH scheme should be assessed for different contexts. Similar to the problem of evaluating the security for encryption primitives, there are three types of attacks:

the Watermarked Only Attack (WOA), in which the attacker only has access to watermarked images;

the Known Message Attack (KMA), in which the attacker has access to several pairs of previously watermarked images and the associated messages. Certainly, the currently transmitted message bits are not known to the attacker;

the Known Original Attack (KOA), in which the attacker has access to several pairs of previously watermarked images and the corresponding cover image. Certainly, the current cover image is not known to the attacker.

The purposes of the last two attacks are mainly to recover the data hiding key, so as to extract the future embedded messages or hack different pieces of content watermarked with the same key. In our proposed RIDH scheme, the data hiding key has been eliminated, and hence, these two attack models are not applicable.

Under the WOA, the only attack type relevant to our scheme, the attacker attempts to extract the embedded message and/or recover the original image from the water-marked and encrypted image $[[f]]^w$. Before evaluating the security under WOA, let us first give the definition of message indistinguishability, which should hold for any secure encryption method.

Definition of Message Indistinguishability—concrete version: We say that an encryption scheme (Enc,Dec) is (c,ϵ) message indistinguishable if for every two messages G and G', and for every Boolean function T of complexity no larger than c, we have |P[T(Enc(K,G))=1]−P[T(Enc(K, G'))=1]|≤ϵ where the probability is taken over the randomness of Enc( ) and the choice of K.

The message indistinguishability implies that the attacker can do no better than simple random guessing if he only observes the ciphertext. This property is regarded as a basic requirement for any secure encryption scheme.

We then have the following Theorem concerning the security of our RIDH algorithm.

Theorem 1: Assuming that the encryption scheme (Enc, Dec) is secure in terms of message indistinguishability, then our RIDH system is secure under WOA attack.

Sketch of the proof: Upon getting the watermarked and encrypted image $[[f]]^w$, we can still partition it into non-overlapping blocks of size M×N. For each block, we can generate S decoding candidates:

$$f_i^{(0)} = [[f]]_i^w \oplus Q_0 = f_i^w \oplus Q_0 \oplus K_i = Enc(f_i^w \oplus Q_0, K_i)$$
$$f_i^{(1)} = [[f]]_i^w \oplus Q_1 = f_i^w \oplus Q_1 \oplus K_i = Enc(f_i^w \oplus Q_1, K_i)$$
$$\vdots$$
$$f_i^{(S-1)} = [[f]]_i^w \oplus Q_{S-1} = f_i^w \oplus Q_{S-1} \oplus K_i = Enc(f_i^w \oplus Q_{S-1}, K_i)$$

where $K_i$ denotes the sub-keystream for the ith block.

With any observed $f_i^{(j)}$, it is computationally infeasible to figure out, with probability significantly larger than 1/S, which one among $\{f_i^w \oplus Q_0, f_i^w \oplus Q_1, \ldots, f_i^w \oplus Q_{S-1}\}$ is the message encrypted by $K_i$, due to the property of message indistinguishability. Therefore, the attacker attempting to extract the embedded message bits from $[[f]]^w$ should be able to do no better than random guessing. This proves the security of our proposed encrypted-domain RIDH strategy against WOA attack.

The examples of experimental results are described in the following. We experimentally evaluate the embedding performance of our proposed encrypted-domain RIDH scheme. The test set is composed of 100 images of size 512×512 with various characteristics, including natural images, synthetic images, and highly textured images. Obviously, the test set is different from the training set used to derive the two-class SVM classifier.

As described above, we stick to standardized encryption method, and all the images are encrypted using the stream cipher AES-CTR. We would like to compare our scheme with two state-of-the-art algorithms and, where standardized encryption methods were also used.

The comparison of embedding performance of the present invention with the known method 1 of embedding additional message bits into stream cipher encrypted images by flipping 3 LSBs of half of the pixels in a block proposed by X. Zhang (IEEE Signal Processing Lett., vol 18, no. 4, pp. 255-258, 2011) is in table 1 as follows:

TABLE 1

| Block Size | The present invention | | The known method 1 | |
|---|---|---|---|---|
| | Capacity | Accuracy | Capacity | Accuracy |
| 8 × 8 | 12288 bits | 100% | 4096 bits | 84.6870% |
| 8 × 7 | 14016 bits | 100% | — | — |
| 7 × 7 | 15987 bits | 100% | 5329 bits | 82.4600% |
| 7 × 6 | 18615 bits | 100% | — | — |
| 6 × 6 | 21675 bits | 100% | 7225 bits | 79.5779% |
| 6 × 5 | 26010 bits | 99.9958% | — | — |
| 5 × 5 | 31212 bits | 99.9891% | 10404 bits | 75.5110% |
| 5 × 4 | 39168 bits | 99.9807% | — | — |
| 4 × 4 | 49152 bits | 99.9522% | 16384 bits | 69.7053% |
| 3 × 3 | 86700 bits | 99.7265% | 28900 bits | 61.0628% |
| 2 × 2 | 196608 bits | 98.8229% | — | — |

Figure 9:
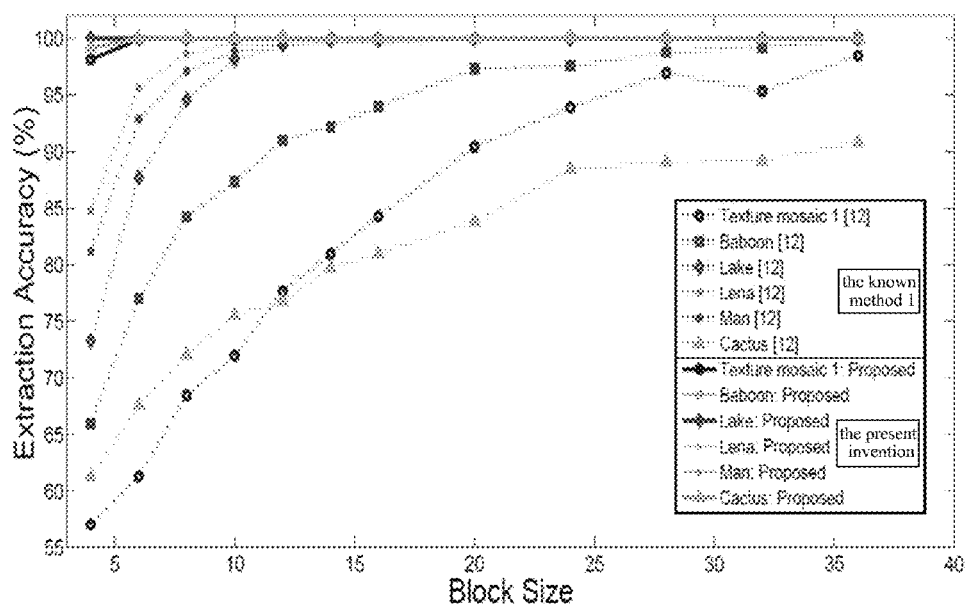
FIG. 9 illustrates comparisons of extraction accuracies of an embodiment of the present application and the known method 1.

Comparison of the extraction accuracy of the bits of the message are illustrated in FIG. 9, wherein the present invention is represented by solid lines and the known method 1 is represented by dashed lines. In Table I, we tabulate the embedding capacity and data extraction accuracy τ of method of the present application and the known method 1 for different settings of block size. Here, τ is defined by:

$$\tau = \frac{\text{\# of correctly extracted bits}}{\text{\# of embedded bits}}$$

and the values given are averaged over all the blocks in the 100 test images. In this table, we fix n=3 in our method, i.e., each block accommodates 3 bits. As the scheme of the known method 1 only works on square blocks bigger than 2×2, the results for non-square configurations are marked with '-'. It can be seen that, for both methods, the embedding capacity increases as the block size drops. The method of the present invention can embed 21675 message bits for each 512×512 image when the block size is 6×6, while ensuring 100% accuracy of data extraction. As the block size decreases further, small number of extraction errors appear. Even when the block size shrinks to 2×2, the accuracy is still as high as 98.8229%. In contrast, the values of τ in the known method 1 are consistently lower than 100%, even when the block size is as big as 8×8. In terms of embedding capacity, our approach is 3 times higher than the known method 1.

Figure 8:
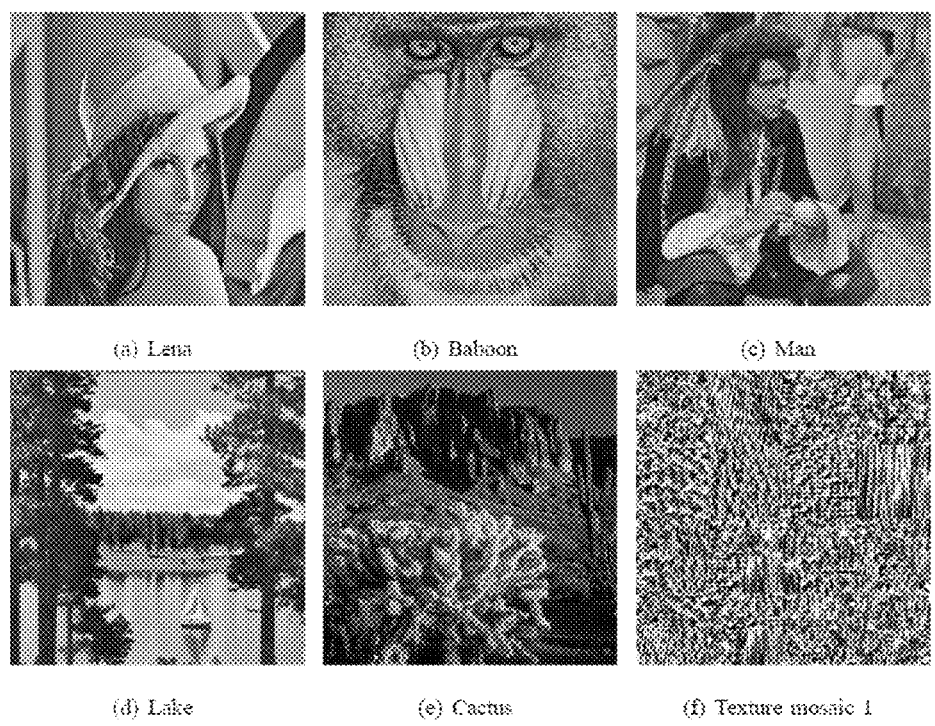
FIG. 8 illustrates six representative test images.

In addition to the comparison of averaged extraction accuracy, we also show the results of both methods for six representative images illustrated in FIG. 8. As can be seen from FIG. 8, for images with large portion of textural regions, e.g., FIG. 8(f) Texture mosaic 1 and FIG. 8(e) Cactus, the known method 1 gives much degraded results, especially when the block size is small. For instance, the extraction accuracy is only 57.01%, slightly better than random guessing, for the image FIG. 8(f) Texture mosaic 1 when the block size is 4×4. In contrast, our method offers much better extraction accuracy for all settings of block size. In fact, extraction errors are only detected in three images FIG. 8(f) Texture mosaic 1, FIG. 8(e) Cactus, and FIG. 8(b) Baboon in the case that the block size is 4×4, while for all the other cases, 100% extraction accuracy is retained.

The number of erroneous blocks with the increase of n as shown in Table 2. Here, the block size is 8×8.

TABLE 2

| | n = 3 | n = 4 | n = 5 | n = 6 | n = 7 | n = 8 | n = 9 | n = 10 |
|---|---|---|---|---|---|---|---|---|
| FIG. 8(e) Cactus | 0 | 0 | 0 | 0 | 0 | 1 | 1 | 3 |
| FIG. 8(f) Texture mosaic 1 | 0 | 0 | 0 | 1 | 2 | 2 | 2 | 6 |
| Others | 0 | 0 | 0 | 0 | 0 | 0 | 0 | 0 |

We also compare the method of the present invention with a known method 2 of using simple substitution to insert additional bits into AES encrypted images proposed by W. Puech, M. Chaumont and O. Strauss (Proc. of SPIE 6819, 2008, pp. 1-9). Besides the advantage of avoiding negotiating an extra data hiding key, our scheme achieves better embedding performance. For a 512×512 image, the embedding capacity of the known method 2 is 16384 bits, as it can only work with 4×4 blocks, and each block accommodates one message bit. As a comparison, the method of the present invention can embed 49152 message bits with the same block size, assuming n=3. Under the above settings, the averaged accuracy of recovering the original image block in our method is 99.9522%, which outperforms the result 97.3062% given by the known method 2. The performance gap becomes even more significant if we focus on the texture-rich images. For FIG. 8(f) Texture mosaic 1, our method leads to the extraction accuracy 98.12%, while the counterpart of the known method 2 is dramatically reduced to 74.83%.

Figure 10:
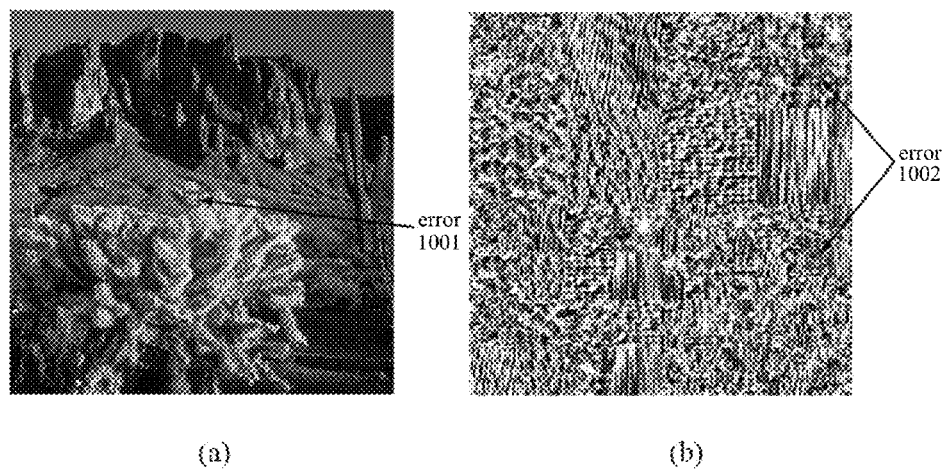
FIG. 10 illustrates blocks in which extraction errors occur according to an embodiment of the present application.

Furthermore, we investigate the effect brought by increasing n, i.e., embed more bits into one single block. Obviously, the number of public keys $Q_j$'s exponentially increases as we make n larger. This will enlarge the complexity of data extraction as we need to examine all the $S=2^n$ decoding candidates. Also, the maximized minimum Hamming distance among all the public keys $Q_j$'s decreases for bigger n, which in turn could result in more extraction errors. Thanks to the powerful error correction mechanism based on image self-similarities, these increased errors can still be corrected to a large extent. As illustrated in Table II, when n≤5, we still can ensure 100% success rate of data extraction for all 100 test images. As we further increase n from 5 to 10, some extraction errors gradually appear only in two test images FIG. 8(f) Texture mosaic 1 and FIG. 8(e) Cactus, which contain highly textured areas. The data extraction in the remaining 98 images can still be perfectly performed. In FIG. 10, we highlight the blocks 1001 and 1002 in which extraction errors occur in the two problematic images when n=8. It can be observed that the incorrectly decoded blocks 1001 and 1002 are untypically homogenous in textural characteristics to their context, which explains the difficulty in discretion by the proposed error correction mechanism.

In the present invention, a secure reversible image data hiding (RIDH) scheme operated over the encrypted domain is proposed. The success of the proposed framework relies on the statistical distinguishability of encrypted and non-encrypted image blocks. A very attractive feature of the proposed RIDH approach is that provable embedding security in terms of message indistinguishability can be achieved without a secret data hiding key. This could lead to significant reduction of cost and potential risk of implementing a key management system (KMS), which has been demonstrated to be very challenging in the multi-party environment. Extensive experimental results are also provided to validate the superior performance of the proposed system.

Besides what is described herein, various modifications can be made to the embodiments and implementations of the present invention without departing from the spirit and the scope of the present invention. Therefore, the illustrations and examples herein should be construed in an illustrative, and not a restriction. The scope of the invention should be deemed solely by reference to the claims as follows.

What is claimed is:

1. A method for reversible image data hiding comprising:
   pre-negotiating a secret encryption key between a first electronic device and a third electronic device, wherein the secret encryption key is to be stored in the first electronic device and the third electronic device;
   encrypting an original image by an encryption process to generate an encrypted image by the first electronic device, wherein the encryption process including:
   retrieving the stored secret encryption key and generating a key stream by using the secret encryption key; and
   generating the encrypted image by XORing the original image with the key stream;
   sending the encrypted image to a second electronic device from the first electronic device through a wireless network;
   embedding a message into the encrypted image by an embedment process to generate an embedded image by the second electronic device which does not know the secret encryption key, wherein the embedment process including:
   generating the embedded image by embedding the message via XORing the encrypted image with a predetermined public key set;
   sending the embedded image to the third electronic device from the second electronic device; and
   extracting the message and the original image from the embedded image by a decryption and extraction process by the third electronic device through computing by at least one processer, wherein the decryption and extraction process including:
   generating a decrypted image by XORing the embedded image with the key stream; and
   generating the message and the original image by XORing the decrypted image with the public key set;
   wherein generating the embedded image by embedding the message via XORing the encrypted image with the predetermined public key further comprises:
   dividing the encrypted image into encrypted blocks; extracting the message into bits of the message;
   finding a public key of the public key set associated with each of the bits of the message;
   XORing each of the public keys with each of the encrypted blocks to generate embedded blocks; and
   assembling the embedded blocks to generate the embedded image.

2. The method of claim 1, wherein generating the message and the original image by XORing the decrypted image with the public key set further comprises:
   dividing the decrypted image into decrypted blocks; creating decoding candidates by XORing the decrypted blocks with each public key of the public key set; and
   identifying which of the decoding candidates are original blocks of the original image by determining the bits of the message through a classifier.

3. The method of claim 2, wherein generating the message and the original image by XORing the decrypted image with the public key set further comprises:
   detecting and correcting errors according to property of non-local image similarity; assembling the bits of the message to generate the message; and
   assembling the original blocks of the original image to generate the original image.

4. The method of claim 1, wherein the first electronic device is a satellite, wherein the second electronic device is a base station, and wherein the third electronic device is a data center.

5. The method of claim 1, wherein no private key for data hiding other than the secret encryption key is used.

6. The method of claim 1, wherein generating the embedded image by embedding the message via XORing the encrypted image with the predetermined public key further comprises:
   performing XORing each of the public keys with each of the encrypted blocks to generate the embedded blocks until all of the bits of the message are embedded; and
   assembling the embedded blocks to generate the embedded image.

7. The method of claim 3, wherein detecting and correcting errors according to property of non-local image similarity further comprises: computing a minimum patch distance within a search window.

8. The method of claim 2, wherein the classifier is a two-class support vector machine classifier.

9. The method of claim 2, wherein the public keys are binary public keys, wherein each of the public keys has a maximized minimum-Hamming distance, and wherein the decrypted blocks are non-overlapping.

* * * * *